United States Patent
Helmer, Jr. et al.

(10) Patent No.: US 8,429,662 B2
(45) Date of Patent: Apr. 23, 2013

(54) PASSING INITIATIVE IN A MULTITASKING MULTIPROCESSOR ENVIRONMENT

(75) Inventors: Leonard W. Helmer, Jr., Stone Ridge, NY (US); John S. Houston, Hopewell Junction, NY (US); Ambrose A. Verdibello, Jr., Millbrook, NY (US)

(73) Assignee: International Business Machines Corporation, Armonk, NY (US)

( * ) Notice: Subject to any disclaimer, the term of this patent is extended or adjusted under 35 U.S.C. 154(b) by 1263 days.

(21) Appl. No.: 12/058,054

(22) Filed: Mar. 28, 2008

(65) Prior Publication Data

US 2009/0217284 A1    Aug. 27, 2009

Related U.S. Application Data

(60) Provisional application No. 61/031,315, filed on Feb. 25, 2008.

(51) Int. Cl.
*G06F 9/46* (2006.01)

(52) U.S. Cl.
USPC .......................................... 718/104

(58) Field of Classification Search ........................ None
See application file for complete search history.

(56) References Cited

U.S. PATENT DOCUMENTS

| | | |
|---|---|---|
| 3,643,227 A | 2/1972 | Smith et al. |
| 4,993,014 A | 2/1991 | Gordon |
| 5,170,472 A | 12/1992 | Cwiakala et al. |
| 5,339,413 A | 8/1994 | Koval et al. |
| 5,343,867 A | 9/1994 | Shankar |
| 5,388,266 A | 2/1995 | Frey et al. |
| 5,452,443 A * | 9/1995 | Oyamada et al. ................ 714/10 |
| 5,524,212 A | 6/1996 | Somani et al. |
| 5,764,641 A | 6/1998 | Lin |
| 5,777,987 A | 7/1998 | Adams et al. |
| 6,073,181 A | 6/2000 | Holland et al. |
| 6,181,677 B1 | 1/2001 | Valli et al. |
| 6,185,629 B1 | 2/2001 | Simpson et al. |
| 6,289,386 B1 | 9/2001 | Vangemert |
| 6,363,457 B1 | 3/2002 | Sundberg |
| 6,483,804 B1 | 11/2002 | Muller et al. |
| 6,507,567 B1 | 1/2003 | Willars |
| 6,741,552 B1 | 5/2004 | McCrosky et al. |
| 6,862,609 B2 | 3/2005 | Merkey |
| 6,993,032 B1 | 1/2006 | Dammann et al. |

(Continued)

OTHER PUBLICATIONS

Non-Final Office Action dated Jun. 23, 2010 for U.S. Appl. No. 12/036,986.

(Continued)

*Primary Examiner* — Eddie P Chan
*Assistant Examiner* — John Lindlof
(74) *Attorney, Agent, or Firm* — Cantor Colburn LLP; Steven Chiu

(57) ABSTRACT

A computer program product for passing initiative in a multitasking multiprocessor environment includes a tangible storage medium readable by a processing circuit and storing instructions for execution by the processing circuit for performing a method. The method includes writing a request to process a resource of the environment to an associated resource control block, setting a resource flag in a central bit vector, the resource flag indicating that a request for processing has been received for the resource, and setting a target processor initiative flag in the environment, the target processor initiative flag indicating a pass of initiative to a target processor responsible for the resource.

17 Claims, 7 Drawing Sheets

U.S. PATENT DOCUMENTS

| | | | |
|---|---|---|---|
| 7,093,024 | B2 | 8/2006 | Craddock et al. |
| 7,200,704 | B2 | 4/2007 | Njoku et al. |
| 7,283,473 | B2 | 10/2007 | Arndt et al. |
| 7,290,077 | B2 | 10/2007 | Gregg et al. |
| 7,366,813 | B2 | 4/2008 | Gregg et al. |
| 7,444,641 | B1 | 10/2008 | Diepstraten et al. |
| 7,467,402 | B2 | 12/2008 | Pennington et al. |
| 7,602,774 | B1 | 10/2009 | Sundaresan et al. |
| 7,613,183 | B1 | 11/2009 | Brewer et al. |
| 2001/0014954 | A1 | 8/2001 | Purcell et al. |
| 2001/0030943 | A1 | 10/2001 | Gregg et al. |
| 2002/0091826 | A1 | 7/2002 | Comeau et al. |
| 2002/0107903 | A1 | 8/2002 | Richter et al. |
| 2002/0194245 | A1 | 12/2002 | Simpson et al. |
| 2003/0005039 | A1 | 1/2003 | Craddock et al. |
| 2003/0018828 | A1 | 1/2003 | Craddock et al. |
| 2003/0061379 | A1 | 3/2003 | Craddock et al. |
| 2004/0123068 | A1 | 6/2004 | Hashimoto |
| 2004/0154007 | A1 | 8/2004 | Koizumi et al. |
| 2004/0202189 | A1 | 10/2004 | Arndt et al. |
| 2004/0221070 | A1 | 11/2004 | Ortega, III et al. |
| 2005/0018669 | A1 | 1/2005 | Arndt et al. |
| 2005/0060445 | A1 | 3/2005 | Beukema et al. |
| 2005/0080933 | A1 | 4/2005 | Herring |
| 2005/0120237 | A1 | 6/2005 | Roux et al. |
| 2005/0144313 | A1 | 6/2005 | Arndt et al. |
| 2006/0048214 | A1 | 3/2006 | Pennington et al. |
| 2006/0176167 | A1 | 8/2006 | Dohrmann |
| 2006/0230185 | A1 | 10/2006 | Errickson et al. |
| 2006/0230209 | A1 | 10/2006 | Gregg et al. |
| 2006/0230219 | A1 | 10/2006 | Njoku et al. |
| 2007/0239963 | A1 | 10/2007 | Yao et al. |
| 2007/0245050 | A1 | 10/2007 | Gregg et al. |
| 2008/0028116 | A1 | 1/2008 | Gregg et al. |
| 2008/0109891 | A1 | 5/2008 | Greenwald et al. |
| 2008/0196041 | A1 | 8/2008 | Gregg et al. |
| 2009/0019312 | A1* | 1/2009 | Kulkarni et al. .............. 714/32 |
| 2009/0094603 | A1 | 4/2009 | Hiltgen et al. |
| 2009/0217238 | A1 | 8/2009 | Errickson et al. |

OTHER PUBLICATIONS

Non-Final Office Action dated Jan. 29, 2010 for U.S. Appl. No. 12/036,979.
Notice of Allowance dated Jun. 23, 2010 for U.S. Appl. No. 12/036,979.
Non-Final Office Action dated Oct. 1, 2010 ffor U.S. Appl. No. 12/037,046.
Non-Final Office Action dated May 17, 2010 for U.S. Appl. No. 12/037,046.
Office Action made Final dated Oct. 6, 2010 for U.S. Appl. No. 12/037,048.
Non-Final Office Action dated Apr. 9, 2010 for U.S. Appl. No. 12/037,048.
Office Action Made Final dated Aug. 12, 2010 for U.S. Appl. No. 12/051,634.
Non-Final Office Action dated Mar. 22, 2010 for U.S. Appl. No. 12/051,634.
Non-Final Office Action dated May 13, 2010 for U.S. Appl. No. 12/051,631.
Non-Final Office Action dated Jun. 1, 2010 for U.S. Appl. No. 12/051,630.
Non-Final Office Action dated Mar. 22, 2011 for U.S. Appl. No. 12/036,983.
Advisory Action dated Feb. 16, 2011 for U.S. Appl. No. 12/036,986.
Office Action made Final dated Dec. 8, 2010 for U.S. Appl. No. 12/036,986.
Notice of Allowance dated JFebruary 7, 2011 for U.S. Appl. No. 12/036,979.
Notice of Allowance dated Apr. 22, 2011 for U.S. Appl. No. 12/037,046.
Notice of Allowance dated Jan. 11, 2011 for U.S. Appl. No. 12/037,048.
Notice of Allowance dated Oct. 15, 2010 for U.S. Appl. No. 12/051,631.
Final Office dated Nov. 12, 2010 for U.S. Appl. No. 12/051,630.
Jeong et al.; A study on TCP Buffer Management Algorithim for Improvement on Network Performance in Grid Environment; 2004 pp. 281-288.
Huang et al., InfiniBand Support in Xen Virtual Machine Environmant, Technical Report, OSU-CISRC-10/05-TR63, Oct. 2005.
"Infiniband Architecture Specification vol. 1", Release 1.0.a, Jun. 19, 2001, pp. 40, 71, 193-194, 366-370, 665-667.
Wu et al., "Design of an InfiniBand Emulator over Myrinet: Challenges, Implementation, and Performance Evaluation", Technical Report, CSU-CISRC-2/01-TR03, 2003.
Non Final Office Action dated Nov. 14, 2011 for U.S. Appl. No. 12/058,034.
Notice of Allowance dated Mar. 9, 2012 for U.S. Appl. No. 12/058,034.
Final Office Action for U.S. Appl. No. 12/051,634—Dated May 9, 2012.
Non Final Office Action dated Dec. 1, 2011 for U.S. Appl. No. 12/051,634.
Non Final Offica Action dated Jan. 9, 2012 for U.S. Appl. No. 12/051,630.
Final Office Action dated Jan. 4, 2012 for U.S. Appl. No. 12/051,628.

* cited by examiner

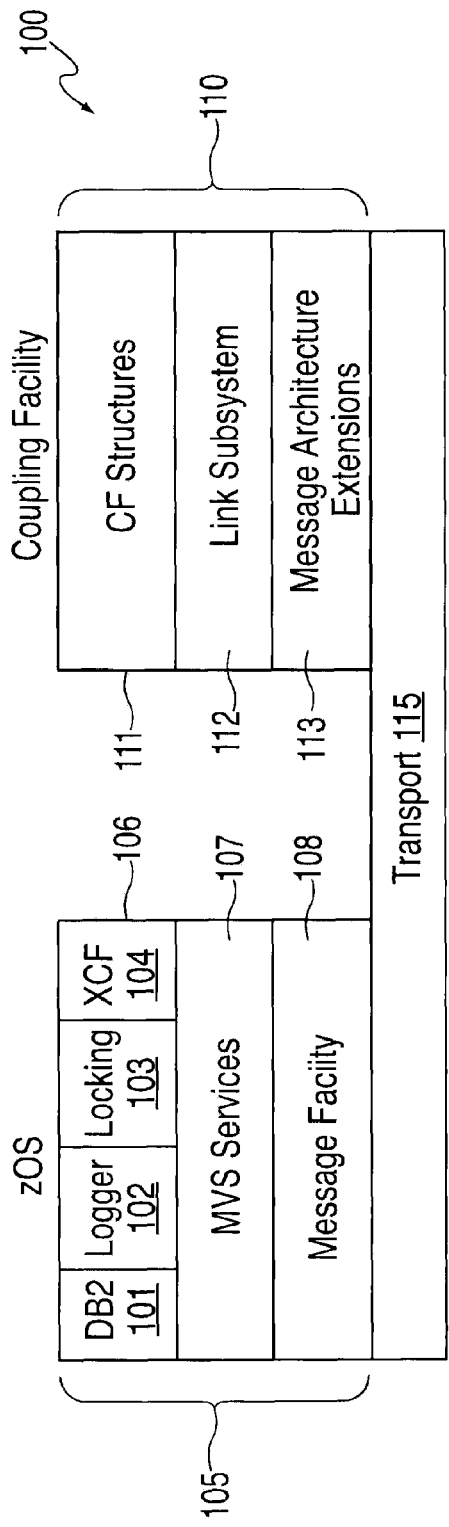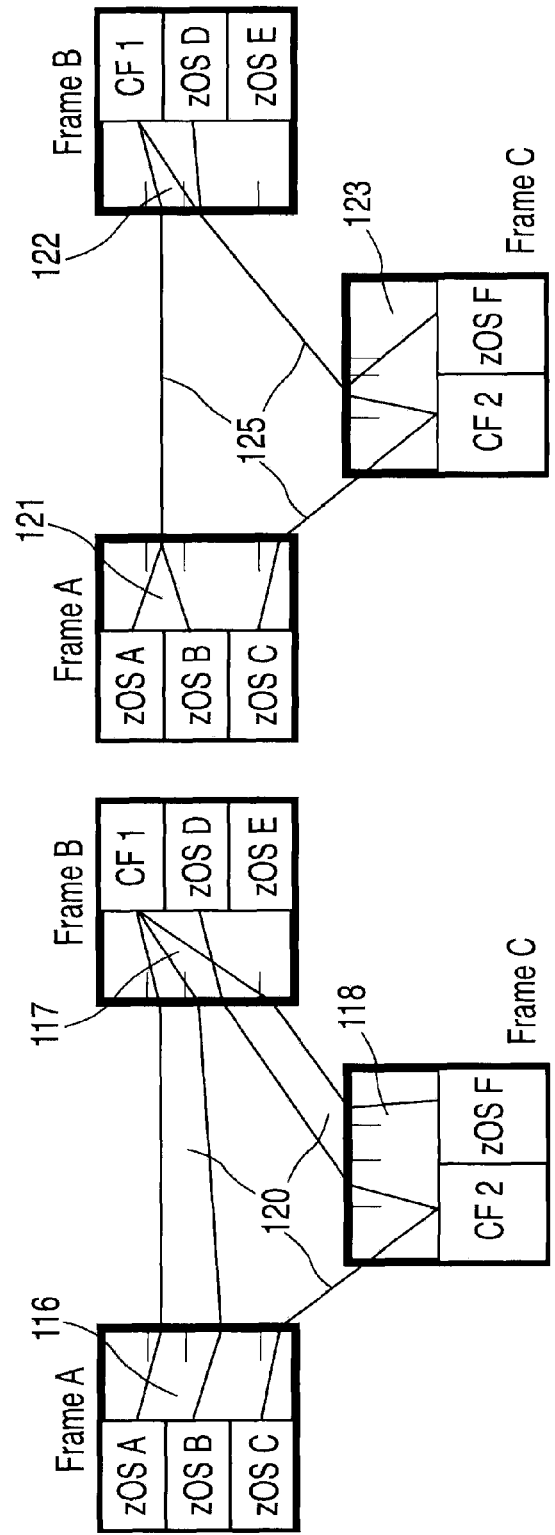

PASSING INITIATIVE IN A MULTITASKING MULTIPROCESSOR ENVIRONMENT

Priority based on U.S. Provisional Patent Application Ser. No. 61/031,315, filed Feb. 25, 2008, and entitled "MULTI-TASKING MULTI-PROCESSOR ENVIRONMENTS OVER INFINIBAND" is claimed, the entire contents of which is incorporated by reference in its entirety.

BACKGROUND OF THE INVENTION

1. Field of Invention

The present disclosure relates generally to multitasking multiprocessor environments, and in particular, to passing initiative in such fully dynamic environments without lock overhead.

2. Description of Background

InfiniBand® Architecture (IBA) is an industry standard architecture for connecting complex systems. Particularly, InfiniBand® (IB), which is a form of System Area Network (SAN), defines a multicast facility that allows a Channel Adapter (CA) to send a packet to a single address and have it delivered to multiple ports. The InfiniBand® Architecture is described in the InfiniBand® standard, which is available at http://www.infinibandta.org, and also hereby incorporated in its entirety by reference.

In a multitasking multiprocessor environment, such as an environment equipped with IBA, there is a need to pass initiative from multiple processors to multiple targets very quickly and efficiently. Using IBA, multiple processing units receive requests across a communications link, and for certain commands or situations, they need to pass those commands to one of several dedicated IO Processors for handling.

Conventionally, this task has been handled by specialized hardware. However, in the case of IBA, there is no such hardware available to address this concern. Proposed solutions to this problem have involved either locking or queues. Each of those approaches carries a performance or complexity penalty. Obtaining locks in a busy system often requires waiting for other tasks to release those locks. This wait time often ties up the processor attempting to obtain the lock, and delays the passing of the lock. Queues often involve some of the same issues as locks in order to guarantee the integrity of the queue.

Furthermore, the dynamic removal of a target IO processor creates a significant problem for the handling of the items previously queued to that processor. In addition, these solutions do not always scale well as the system grows.

BRIEF SUMMARY OF THE INVENTION

An exemplary embodiment includes a computer program product for passing initiative in a multitasking multiprocessor environment. The computer program product includes a tangible storage medium readable by a processing circuit and storing instructions for execution by the processing circuit for performing a method. The method includes writing a request to process a resource of the environment to an associated resource control block, setting a resource flag in a central bit vector, the resource flag indicating that a request for processing has been received for the resource, and setting a target processor initiative flag in the environment, the target processor initiative flag indicating a pass of initiative to a target processor responsible for the resource.

Another exemplary embodiment includes a multitasking multiprocessor environment. The environment includes a plurality of processors configured to process work requests for resources of the environment, a central bit vector containing flags indicative of the work requests, and a plurality of target processors configured to receive initiative based on the central bit vector.

A further exemplary embodiment includes a method for passing initiative in a multitasking multiprocessor environment. The method includes writing a request to process a resource of the environment to an associated resource control block, setting a resource flag in a central bit vector, the resource flag indicating that a request for processing has been received for the resource, and setting a target processor initiative flag in the environment, the target processor initiative flag indicating a pass of initiative to a target processor responsible for the resource.

Other articles of manufacture, apparatuses, and/or methods according to embodiments will be or become apparent to one with skill in the art upon review of the following drawings and detailed description. It is intended that all such additional articles of manufacture, apparatuses, and/or methods be included within this description, be within the scope of the present invention, and be protected by the accompanying claims.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 1A illustrates an example embodiment of a multitasking multiprocessor Infiniband® system;

FIG. 1B illustrates an example of a multitasking multiprocessor environment;

FIG. 1C illustrates a multitasking multiprocessor environment, according to an example embodiment;

DETAILED DESCRIPTION OF THE INVENTION

Figure 1D:
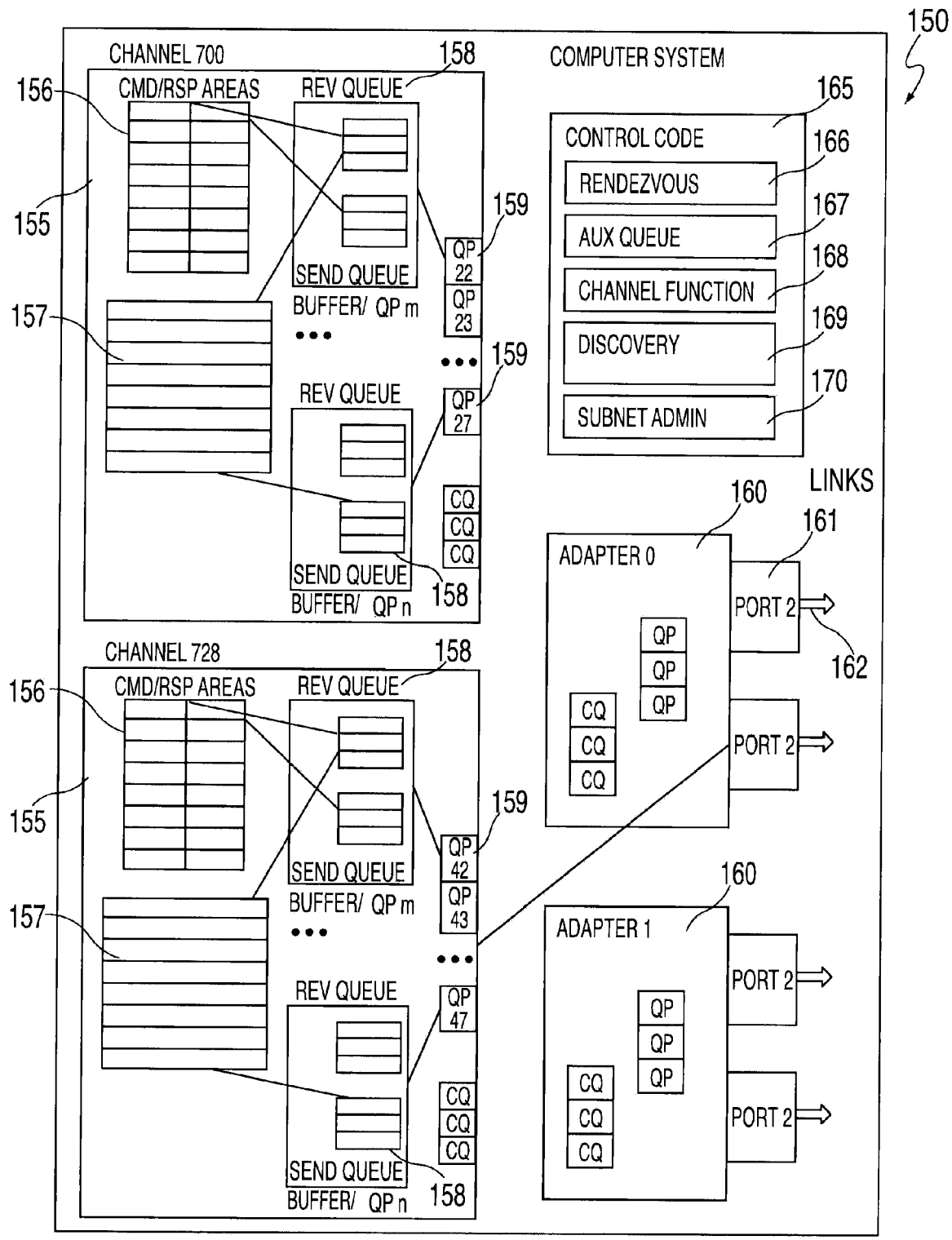
FIG. 1D illustrates a multitasking multiprocessor environment, according to an example embodiment.

Detailed illustrative embodiments are disclosed herein. However, specific functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of this disclosure and the associated claims.

It should be understood that, although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting of example embodiments.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Hereinafter, example embodiments of the present invention will be described in detail. An example embodiment of the present invention provides a method of passing initiative in a fully dynamic environment. Technical effects of example embodiments include the ability to pass initiative to target processor(s) without lock overhead. Example embodiments provide a common registry configured to strategize passing of initiative through use of binary masks. Thus, according to example embodiments, specialized hardware typically used for passing initiative may be omitted and communications links may be more effectively used between processors of a multitasking multiprocessor environment, such as, an environment utilizing IBA.

FIG. 1A illustrates an exemplary embodiment of a multitasking multiprocessor Infiniband system 100. The system 100 can include an operating system 105 (e.g., IBM zOS) having a top layer including a relational database 101 a logging facility 102, a locking facility 103 and a cross system coupling facility (XCF). The operating system 105 can further include a multiple virtual storage (MVS) services layer 107 and a message facility layer 108. The system 100 can further include a coupling facility (CF) 110 having a CF structures layer 111, a link subsystem 112 and a message architecture extensions layer 113. In an exemplary embodiment, a transport layer 115 is disposed between and couples the operating system 105 and the CF 110. In an exemplary implementation, the transport layer 115 is supported by Infiniband. FIG. 1B illustrates an example of a multitasking multiprocessor environment. The example shows three mainframes A, B, C connected into a two different Parallel Sysplex environments using the previous generation of coupling transports. zOS A, zOS B and zOS F are all tied together through a Coupling Facility (CF1). zOS C and zOS D are tied together through CF2. Meanwhile zOS E is a stand alone operating system. In this configuration separate channels are connected through separate adapters in the separate frames. It is appreciated that multiple internal channels 116, 117, 118 include separate external connections 120. FIG. 1C illustrates an example of a multitasking multiprocessor environment in accordance with an exemplary embodiment. In this example, multiple internal channels 121, 122, 123 share the same physical connection 125. FIG. 1 D illustrates an example of a multitasking multiprocessor environment 150 in accordance with an exemplary embodiment. The environment 150 can include one or more channels 155, each channel including command/response areas 156, data buffers 157, receive/send queues 158 and adapters 160 for mapping the channels 155 to ports 161 and ultimately communication links 162, for example, as supported by IBA. The channels 155 can further include queue pairs 159 as discussed further herein. The system 150 can further include control code 165 having functions including but not limited to: rendezvous 166, auxiliary queue 167, channel 168, discovery 169 and subnet administrator 170.

Figure 2:
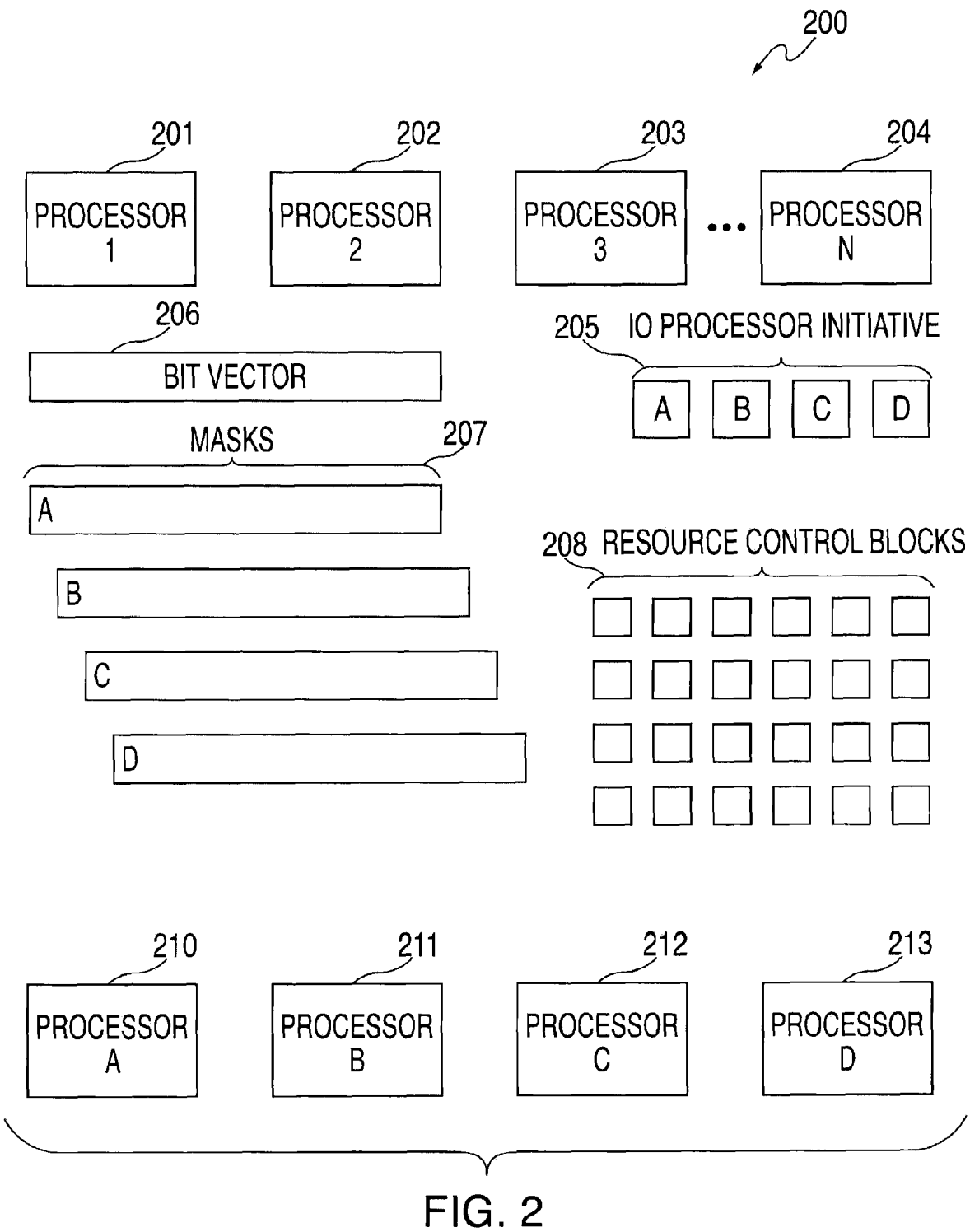
FIG. 2 illustrates a multitasking multiprocessor environment, according to an example embodiment.

Turning to FIG. 2, a simplified block diagram of a multitasking multiprocessor system 200 is illustrated, according to an example embodiment. It is noted that FIG. 2 is a simplified block diagram included to aid in understanding of example embodiments only, and that other components, interconnections, and the like may be included or omitted depending on any particular implementation. Thus, example embodiments should not be limited to only those simplified structures illustrated in FIG. 2. The system 200 of FIG. 2 includes a plurality of processors 201-204 and 210-213. Each processor of the plurality of processors may be a computer processor capable of executing computer instructions, code, etc. For example, a processor of the plurality of processors may be a computer processor configured to execute instructions in accordance with passing initiative to another processor similar to the methodologies described herein.

The system 200 further includes a central bit vector 206. The central bit vector 206 may be a master list of all resources of environment 200 requiring attention where initiative is being passed to a target IO processor (e.g., processors 210, 211, 212, and/or 213). The environment 200 further includes IO processor initiative blocks 205. For example, each processor initiative block of the initiative blocks 205 may correspond to a target processor. According to the simplified structure of FIG. 2, processors 210, 211, 212, and 213 are denoted A, B, C, and D, respectively to denote relationships with corresponding initiative blocks 205. Thus, processor A (210) may correspond to processor initiative block A of initiative blocks 205.

The environment 200 further includes resource control blocks 208. For example, each resource block of the resource control blocks 208 corresponds to a particular resource of the environment 200 which may require work by a target processor. Furthermore, the resource control blocks 208 may contain flags indicating the type of work that is being requested and other details regarding the work required of the target processor.

The environment 200 further includes masks 207. Masks 207 may include binary masks or other logical masks configured to provide the ability to determine a flag value within the bit vector 206. For example, if a logical AND operation is executed between a mask of masks 207 and the bit vector 206, the resulting vector will contain only particular flag values corresponding to binary 'ones' of the mask used. According to the simplified structure of FIG. 2, each mask of the masks 207 is denoted with letters A, B, C, or D to reflect its relationship with one of the target processors 210, 211, 212, and 213, respectively.

The environment 200 makes use of flags including a control block flag located in respective control blocks 208, a target processor flag located in respective processor initiative blocks 205, and/or other suitable flags. For example, the control block flag may indicate a type of work being requested. The target processor flag may provide initiative for the target IO processor to check for work. The masks 207 may be used by corresponding target IO processors (e.g., processors 210-213) to determine which resources they are responsible for handling from the central bit vector. The association of resources to target IO processors may be somewhat stable, and may also be modified to correspond with any particular implementation or system state. Modifications of associated resource flags in the central bit vector may be facilitated with a simple compare and swap operation. According to at least one example embodiment, the compare and swap operation may be performed based on the smallest addressable unit for a compare and swap instruction. Hereinafter, methodologies of passing initiative to processors of a multitasking multiprocessor environment are described with reference to FIGS. 3-4.

Figure 3:
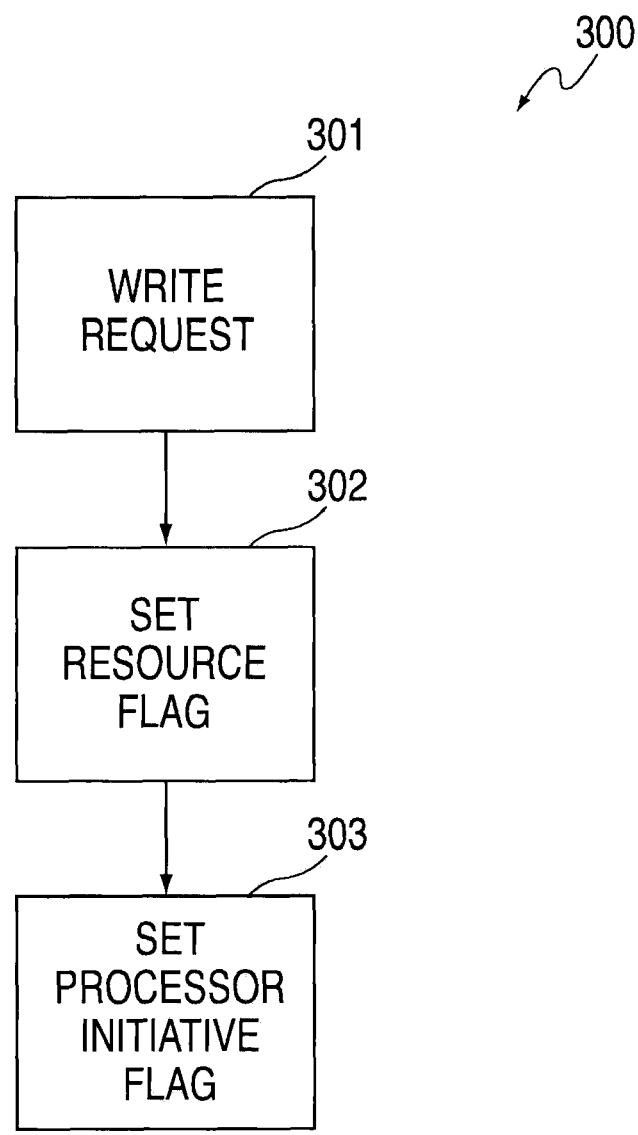
FIG. 3 illustrates a method for passing initiative in a multitasking multiprocessor environment, according to an example embodiment.

Turning to FIG. 3, a method 300 of passing initiative in a multitasking multiprocessor environment includes writing a request at block 301. For example, the processor initially handling the operation wishes to pass the request off to a target IO processor that is better suited to handle the next operation. It may write information pertaining to the request to the appropriate resource control block. Furthermore, a resource flag may be set corresponding to the associated resource control block at block 302. For example, a binary flag may be set in a central bit vector of the environment corresponding to the resource. The binary flag may be set using a compare and swap operation. The method 300 further includes setting a processor initiative flag at block 303. For example, target processors of the environment may be configured to monitor processor initiative flags. Upon occurrence of an appropriate flag, initiative may be passed to a target processor of the environment.

Figure 4:
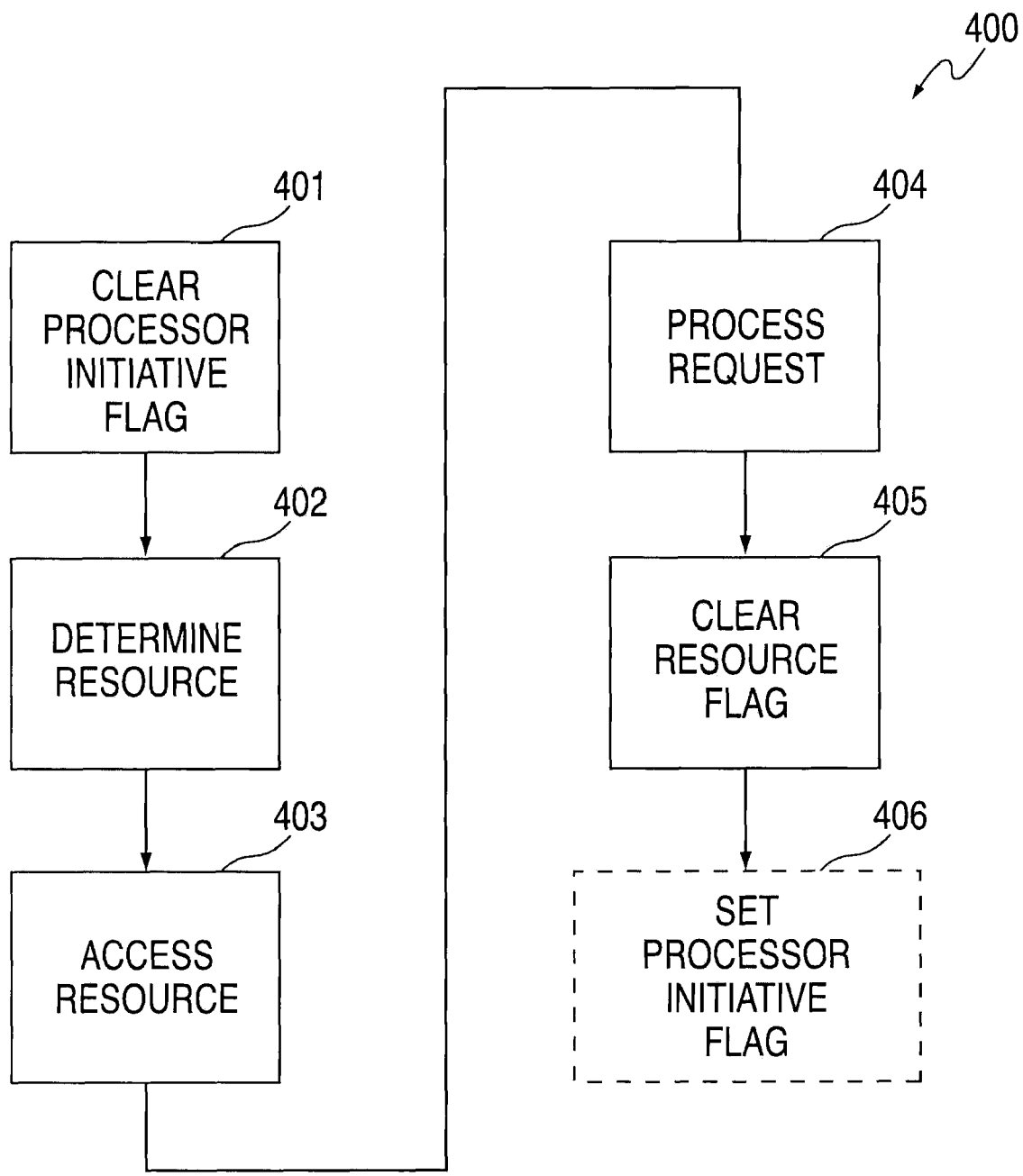
FIG. 4 illustrates a method for passing initiative in a multitasking multiprocessor environment, according to an example embodiment.

Turning to FIG. 4, a method 400 of receiving or handling initiative in a multitasking multiprocessor environment includes clearing a processor initiative flag at block 401. For example, a target processor of the environment may poll a processor initiative flag to determine if initiative is being passed. If the processor determines initiative is being passed, the processor may clear the initiative flag and perform any related tasks requested. The method 400 further includes determining a resource associated with the initiative flag at block 402. For example, the target processor may perform a logical AND operation using an associated binary mask and a central bit vector. The resulting vector includes flags for particular resources belonging, or assigned, to the target processor.

The method 400 further includes accessing the determined resource at block 403. For example, the target processor may read a resource control block for the determined resource to extract information related to a requested task for the resource. The method 400 further includes processing the requested task at block 404. The method further includes clearing the determined resource flag at block 405. For example, as described with reference to block 402, a flag is unveiled using a logical AND operation. This flag is cleared upon processing of the requested task. The method 400 further includes setting the processor initiative flag at block 406. For example, if a resource was processed in block 404, the processor initiative flag may be set to ensure that any additional tasks associated with the processor are not skipped due to the flag being cleared at block 401. Thus, if no resource is determined in block 402, the processor initiative flag remains unset until it is set due to a work request.

Thus, example embodiments of the present invention provide methodologies of passing initiative in multitasking multi-processing environments. The methodologies are facilitated through several structures included within the environment.

Figure 5:
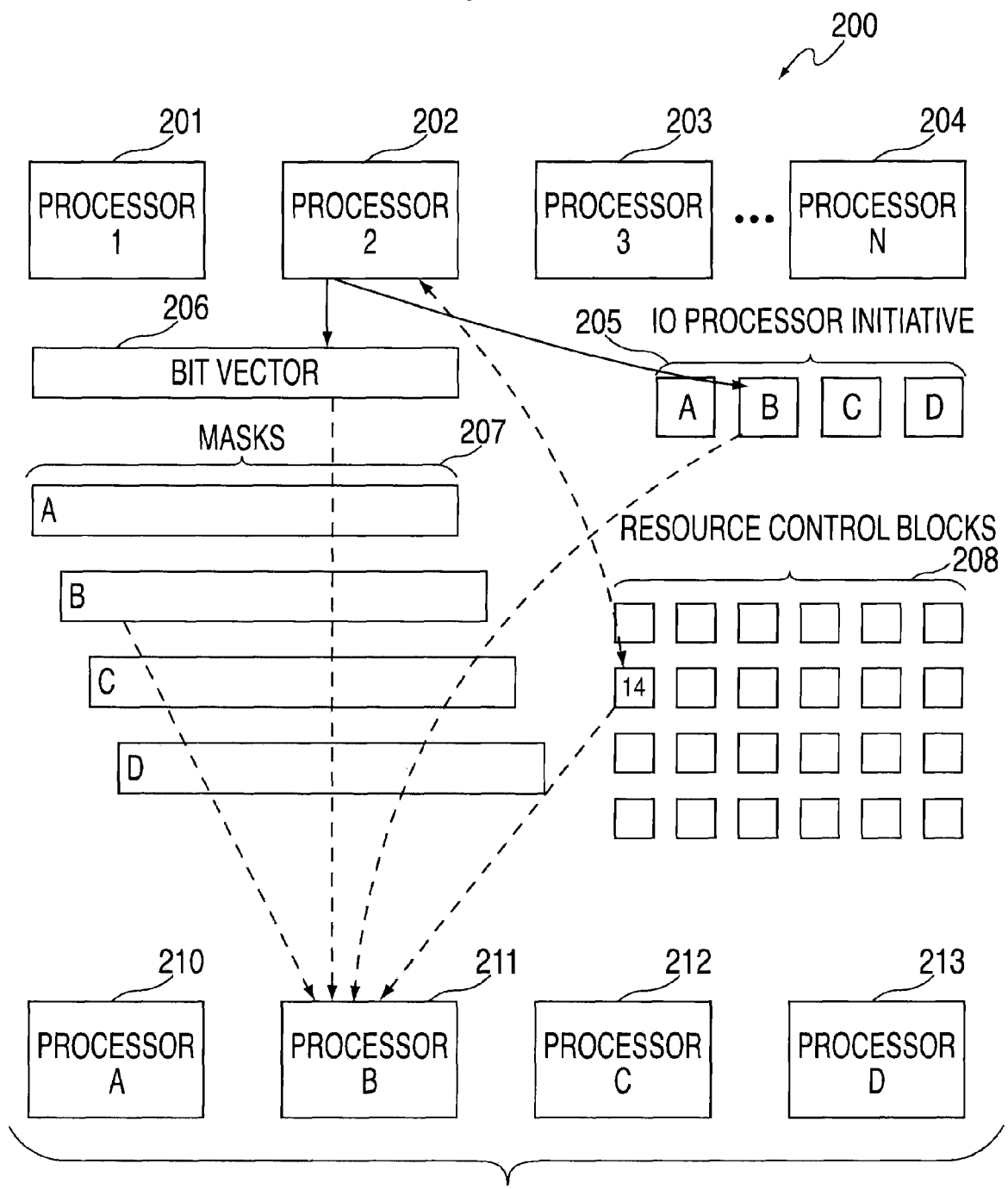
FIG. 5 illustrates a multitasking multiprocessor environment implementing an example methodology, according to an example embodiment.

Hereinafter, a more detailed description of example structures for passing initiative utilizing a central bit vector and mask is given with reference to FIG. 5. However, this discussion is given by way of example only, and should not be construed as limiting. As illustrated, FIG. 5 provides a more detailed illustration of passing initiative based on the previously described methodologies and the environment 200.

For the purposes of example explanation, a central bit vector 206 may include twenty-four (24) bits representing twenty-four separate resources or resource control blocks 208 of a multitasking multiprocessor environment. There may be more or less bits depending upon any particular implementation. In at least one example implementation, a bit which is 'set' (i.e., given a logical value of one) may indicate that the corresponding resource has a pending request for a target processor.

An example central bit vector and masks are provided in Table 1, below:

TABLE 1

| | BIT VECTOR | | | | | | | | | | | | | | | | | | | | | | | |
|---|---|---|---|---|---|---|---|---|---|---|---|---|---|---|---|---|---|---|---|---|---|---|---|---|
| RESOURCE | 0 | 1 | 2 | 3 | 4 | 5 | 6 | 7 | 8 | 9 | A | B | C | D | E | F | 10 | 11 | 12 | 13 | 14 | 15 | 16 | 17 |
| FLAG | 0 | 0 | 0 | 0 | 0 | 1 | 0 | 0 | 0 | 0 | 0 | 0 | 0 | 1 | 0 | 0 | 0 | 0 | 1 | 0 | 0 | 1 | 0 | 0 |
| | MASKS | | | | | | | | | | | | | | | | | | | | | | | |
| MASK A | 0 | 0 | 0 | 0 | 1 | 1 | 1 | 1 | 0 | 0 | 0 | 0 | 0 | 0 | 0 | 0 | 0 | 0 | 0 | 0 | 0 | 0 | 0 | 0 |
| MASK B | 1 | 1 | 1 | 1 | 0 | 0 | 0 | 0 | 0 | 0 | 0 | 0 | 0 | 0 | 0 | 0 | 0 | 0 | 0 | 0 | 1 | 1 | 1 | 1 |
| MASK C | 0 | 0 | 0 | 0 | 0 | 0 | 0 | 0 | 1 | 1 | 1 | 1 | 1 | 1 | 1 | 1 | 0 | 0 | 0 | 0 | 0 | 0 | 0 | 0 |
| MASK D | 0 | 0 | 0 | 0 | 0 | 0 | 0 | 0 | 0 | 0 | 0 | 0 | 0 | 0 | 0 | 0 | 1 | 1 | 1 | 1 | 0 | 0 | 0 | 0 |

As shown in Table 1, the bit vector may contain flag values for resources 0-17. Furthermore, each mask corresponding to a target processor (e.g., processors A, B, C, and D) contains logical 'one' values and logical 'zero' values. If a logical AND operation is performed between any mask and the central bit vector of Table 1, a resulting vector will contain values for any flags associated with the logical 'ones' of the mask. More clearly, if a processor initiative flag is set for processor B (211), processor B may clear the initiative flag (205), and perform a logical AND operation using its associated mask (207). Based on example Table 1, a logical AND operation between mask B and the central bit vector results in a vector containing a logical 'one' value for resource '14'. Thus, resource 14 is associated with processor B and thus, processor B has determined that resource '14' requires processing. Furthermore, according to at least one example embodiment, upon processing a request for a resource, the target processor may save the current bit position of the resultant vector to implement fairness among the resources assigned to it.

Processor B may retrieve information from the resource control block (208) associated with resource '14' to determine the action being requested. Once processor B completes processing the request, it may use a compare and swap operation to clear the bit associated with resource '14' in the bit vector (206). Further, because an entry has been processed, the IO processor initiative flag (205) will be set again (e.g., to pass initiative to a processor), and the process is repeated again.

It is noted that according to the above description, particular target processors are associated with particular resources according to binary values included within a binary mask. Accordingly, it is plausible that if a particular processor is inoperable or disabled, the remaining target processors may not process all resources due to lack of binary values for the resources associated with the inactive processor. Therefore, according to at least one example embodiment, in the event a target processor becomes or is inactive, a supervisory agent or recovery task may reassign the resources through modification of the remaining binary masks. Thereafter, associated processor initiative flags may be set to ensure the resources are handled correctly. It is noted that this approach does not necessitate modification of the central bit vector.

Figure 6:
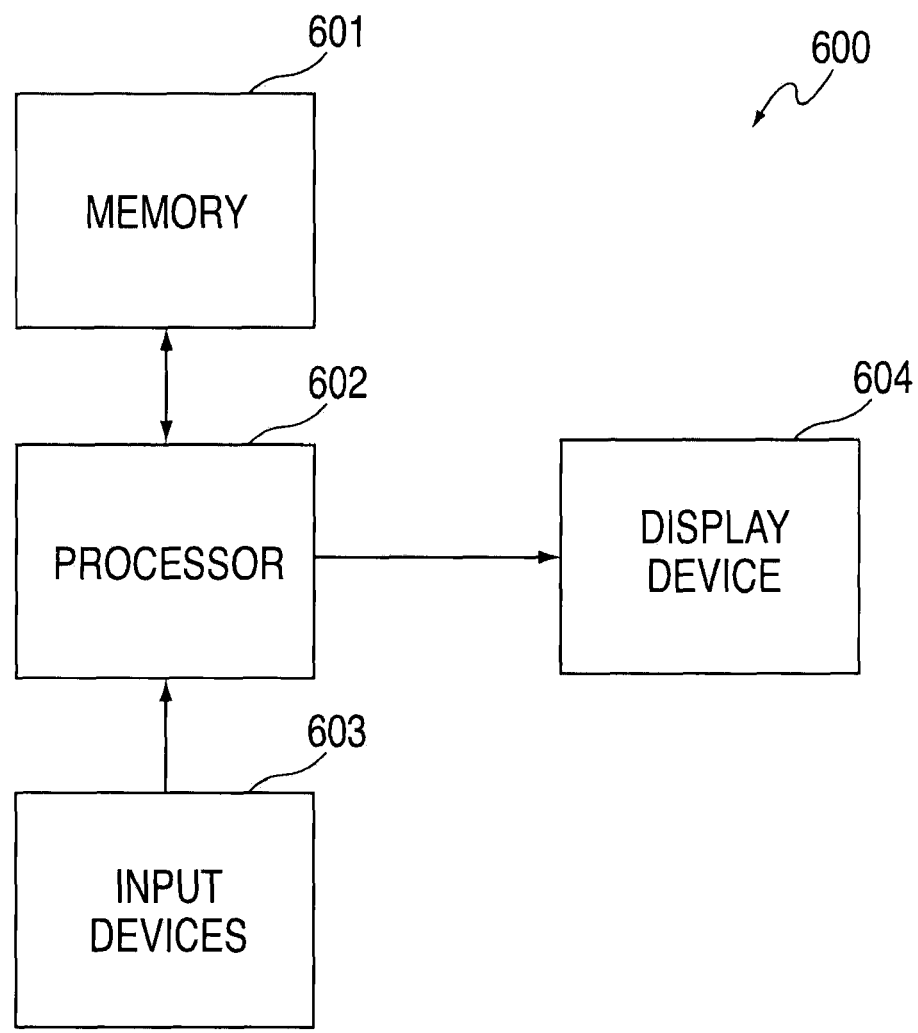
FIG. 6 illustrates a computer apparatus, according to an example embodiment. The detailed description explains the preferred embodiments of the invention, together with advantages and features, by way of example with reference to the drawings.

It is further noted that embodiments of the invention may be embodied in the form of computer-implemented processes and apparatuses for practicing those processes. Therefore, according to an exemplary embodiment, the methodologies described hereinbefore may be implemented by a computer system or apparatus. For example, FIG. 6 illustrates a computer apparatus, according to an exemplary embodiment. Therefore, portions or the entirety of the methodologies described herein may be executed as instructions in a processor 602 of the computer system 600. The computer system 600 includes memory 601 for storage of instructions and information, input device(s) 603 for computer communication, and display device 604. Thus, the present invention may be implemented, in software, for example, as any suitable computer program on a computer system somewhat similar to computer system 600. For example, a program in accordance with the present invention may be a computer program product causing a computer to execute the example methods described herein.

The computer program product may include a computer-readable medium having computer program logic or code portions embodied thereon for enabling a processor (e.g., 602) of a computer apparatus (e.g., 600) to perform one or more functions in accordance with one or more of the example methodologies described above. The computer program logic may thus cause the processor to perform one or more of the example methodologies, or one or more functions of a given methodology described herein.

The computer-readable storage medium may be a built-in medium installed inside a computer main body or removable medium arranged so that it can be separated from the computer main body. Examples of the built-in medium include, but are not limited to, rewriteable non-volatile memories, such as RAMs, ROMs, flash memories, and hard disks. Examples of a removable medium may include, but are not limited to, optical storage media such as CD-ROMs and DVDs; magneto-optical storage media such as MOs; magnetism storage media such as floppy disks (trademark), cassette tapes, and removable hard disks; media with a built-in rewriteable non-volatile memory such as memory cards; and media with a built-in ROM, such as ROM cassettes.

Further, such programs, when recorded on computer-readable storage media, may be readily stored and distributed. The storage medium, as it is read by a computer, may enable the method(s) disclosed herein, in accordance with an exemplary embodiment of the present invention.

With example embodiments of the present invention having thus been described, it will be obvious that the same may be varied in many ways. The description of the invention hereinbefore uses these examples, including the best mode, to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Such variations are not to be regarded as a departure from the spirit and scope of the present invention, and all such modifications are intended to be included within the scope of the present invention as stated in the following claims.

What is claimed is:

1. A computer program product for passing initiative in a multitasking multiprocessor environment, the computer program product comprising:
   a non-transitory storage medium readable by a processing circuit and storing instructions for execution by the processing circuit for performing a method comprising:
      writing a request to process a resource of the environment to an associated resource control block;
      setting a resource flag in a central bit vector, the resource flag indicating that the request for processing has been received for the resource;
      setting a target processor initiative flag in the environment, the target processor initiative flag monitored by a target processor and indicating a pass of initiative to the target processor responsible for the resource;
      clearing the target processor initiative flag;
      determining, at the target processor, the resource associated with the resource flag;
      processing the request at the target processor; and
      subsequent to clearing the target processor initiative flag, setting the processor initiative flag to ensure that any additional tasks associated with the target processor are not skipped.

2. The computer program product of claim 1, wherein the method further comprises:
   accessing the associated resource control block to determine a type of the request.

3. The computer program product of claim 1, wherein the method further comprises clearing the resource flag.

4. The computer program product of claim 1, wherein determining the resource includes performing a logical AND operation between a target processor mask associated with the target processor and the central bit vector.

5. The computer program product of claim 4, wherein the logical AND operation results in a vector containing flag values for all resources associated with only the target processor.

6. The computer program product of claim 1, wherein the resource control block includes information pertaining to an associated target processor.

7. The computer program product of claim 1, wherein the central bit vector is a vector containing binary flag values for every resource of the environment.

8. A computer system for passing initiative in a multitasking multiprocessor environment, the system comprising a plurality of processors including a target processor and a central bit vector, the system configured to perform a method comprising:
  writing a request to process a resource of the environment to an associated resource control block;
  setting a resource flag in the central bit vector, the resource flag indicating that the request for processing has been received for the resource;
  setting a target processor initiative flag in the environment, the target processor initiative flag monitored by the target processor responsible for the resource and indicating a pass of initiative to the target processor
  clearing the target processor initiative flag;
  determining, at the target processor, the resource associated with the resource flag;
  processing the request at the target processor; and
  subsequent to clearing the target processor initiative flag, setting the processor initiative flag to ensure that any additional tasks associated with the target processor are not skipped.

9. The system of claim 8, wherein the central bit vector is a vector containing binary flag values for every resource of the environment.

10. The system of claim 8, wherein the target processor receives initiative through an associated mask that is configured to provide information pertaining to resources associated with the target processor.

11. A method for passing initiative in a multitasking multiprocessor environment, the method comprising:
  writing a request to process a resource of the environment to an associated resource control block;
  setting a resource flag in a central bit vector, the resource flag indicating that the request for processing has been received for the resource;
  setting a target processor initiative flag in the environment, the target processor initiative flag monitored by a target processor responsible for the resource and indicating a pass of initiative to the target processor;
  clearing the target processor initiative flag;
  determining, at the target processor, the resource associated with the resource flag;
  processing the request at the target processor; and
  subsequent to clearing the target processor initiative flag, setting the processor initiative flag to ensure that any additional tasks associated with the target processor are not skipped.

12. The method of claim 11, further comprising:
  accessing the associated resource control block to determine a type of the request.

13. The method of claim 11, further comprising clearing the resource flag.

14. The method of claim 11, wherein determining the resource includes performing a logical AND operation between a target processor mask associated with the target processor and the central bit vector.

15. The method of claim 14, wherein the logical AND operation results in a vector containing flag values for all resources associated with only the target processor.

16. The method of claim 11, wherein the resource control block includes information pertaining to an associated target processor.

17. The method of claim 11, wherein the central bit vector is a vector containing binary flag values for every resource of the environment.

* * * * *